(12) United States Patent
Yamamoto et al.

(10) Patent No.: US 7,922,373 B2
(45) Date of Patent: Apr. 12, 2011

(54) IMAGE DISPLAY APPARATUS INCLUDING A CONTROLLER THAT CONTROLS A LIGHT AMOUNT REGULATING FILM BASED ON AN AMOUNT OF EXTRANEOUS LIGHT RECEIVED BY A LIGHT RECEIVING ELEMENT

(75) Inventors: Kazuhisa Yamamoto, Osaka (JP);
Tetsuro Mizushima, Hyogo (JP);
Shinichi Kadowaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 249 days.

(21) Appl. No.: 12/271,155

(22) Filed: Nov. 14, 2008

(65) Prior Publication Data

US 2009/0141496 A1 Jun. 4, 2009

(30) Foreign Application Priority Data

Nov. 16, 2007 (JP) .................................. 2007-297572

(51) Int. Cl.
*B60Q 3/04* (2006.01)
*F21V 9/16* (2006.01)
*F21V 8/00* (2006.01)
*G02B 27/20* (2006.01)
(52) U.S. Cl. .......... 362/489; 362/84; 362/259; 362/260; 362/293; 362/503; 362/511

(58) Field of Classification Search ................... 362/482, 362/84, 259, 293, 260, 503, 511; 349/11; 40/542, 543
See application file for complete search history.

(56) References Cited

U.S. PATENT DOCUMENTS

| 4,447,128 | A | * | 5/1984 | Ferrer | 349/11 |
| 5,892,598 | A | * | 4/1999 | Asakawa et al. | 349/11 |
| 6,100,943 | A | * | 8/2000 | Koide et al. | 349/11 |
| 6,637,905 | B1 | * | 10/2003 | Ng et al. | 362/84 |
| 7,002,720 | B2 | * | 2/2006 | Beteille et al. | 359/265 |
| 7,235,792 | B2 | * | 6/2007 | Elofson | 250/461.1 |

FOREIGN PATENT DOCUMENTS

| JP | 8-76050 | 3/1996 |
| JP | 2000-168352 | 6/2000 |

* cited by examiner

*Primary Examiner* — Alan Cariaso
(74) *Attorney, Agent, or Firm* — Wenderoth, Lind & Ponack, L.L.P.

(57) ABSTRACT

An image display apparatus includes a laser source for emitting ultraviolet or blue display-use laser light having a wavelength of 420 nm or less; and a display unit including a fluorescent light generating section for generating fluorescent light when irradiated with the display-use laser light, wherein the display unit displays an image using the fluorescent light generated by the fluorescent light generating section, wherein the display unit further includes an extraneous light shielding section for shielding an extraneous light which is emitted from a back side of the display unit and which has a wavelength in a range where the fluorescent light is generated so as to prevent the extraneous light from entering in the fluorescent light generating section.

15 Claims, 10 Drawing Sheets

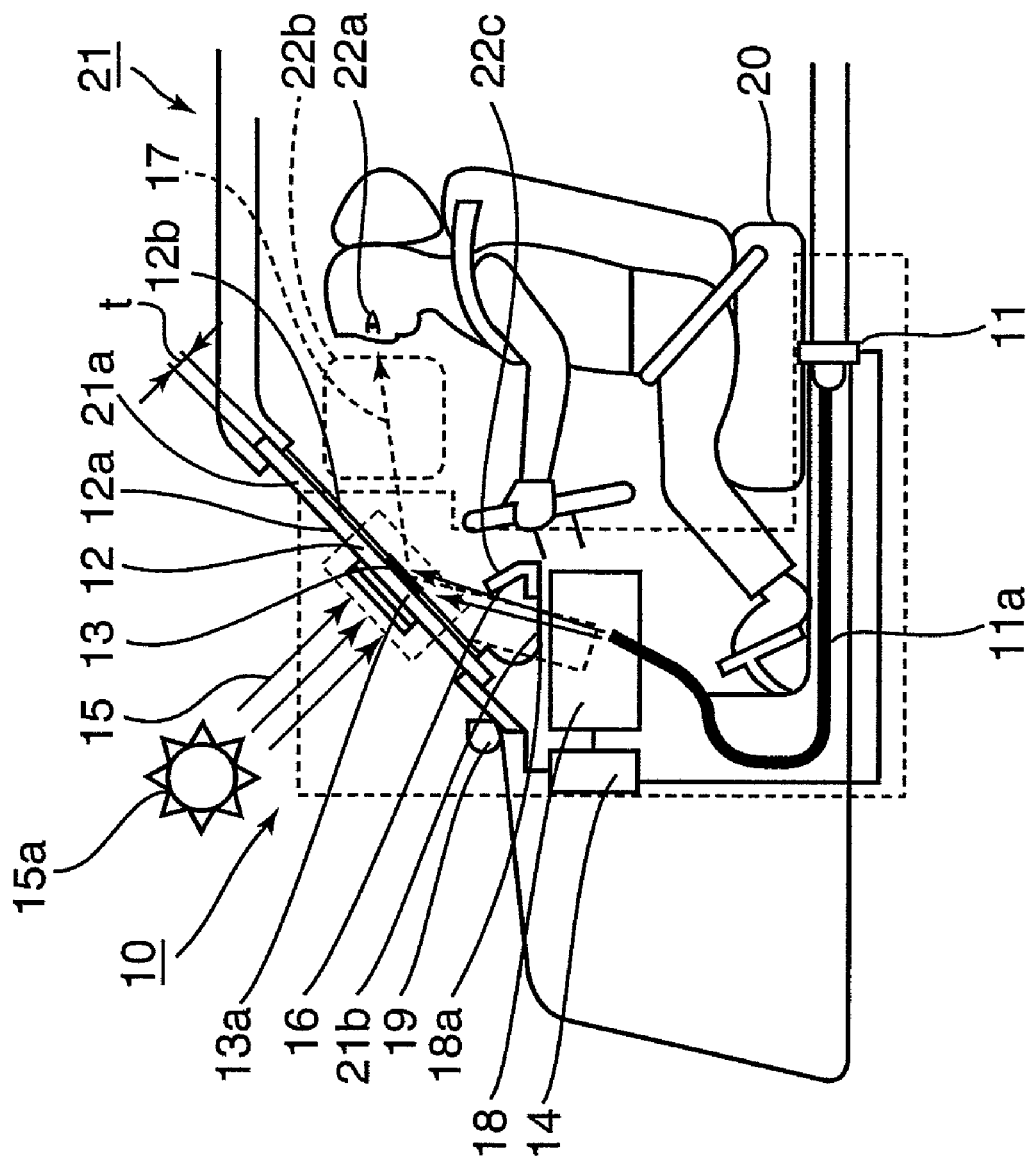

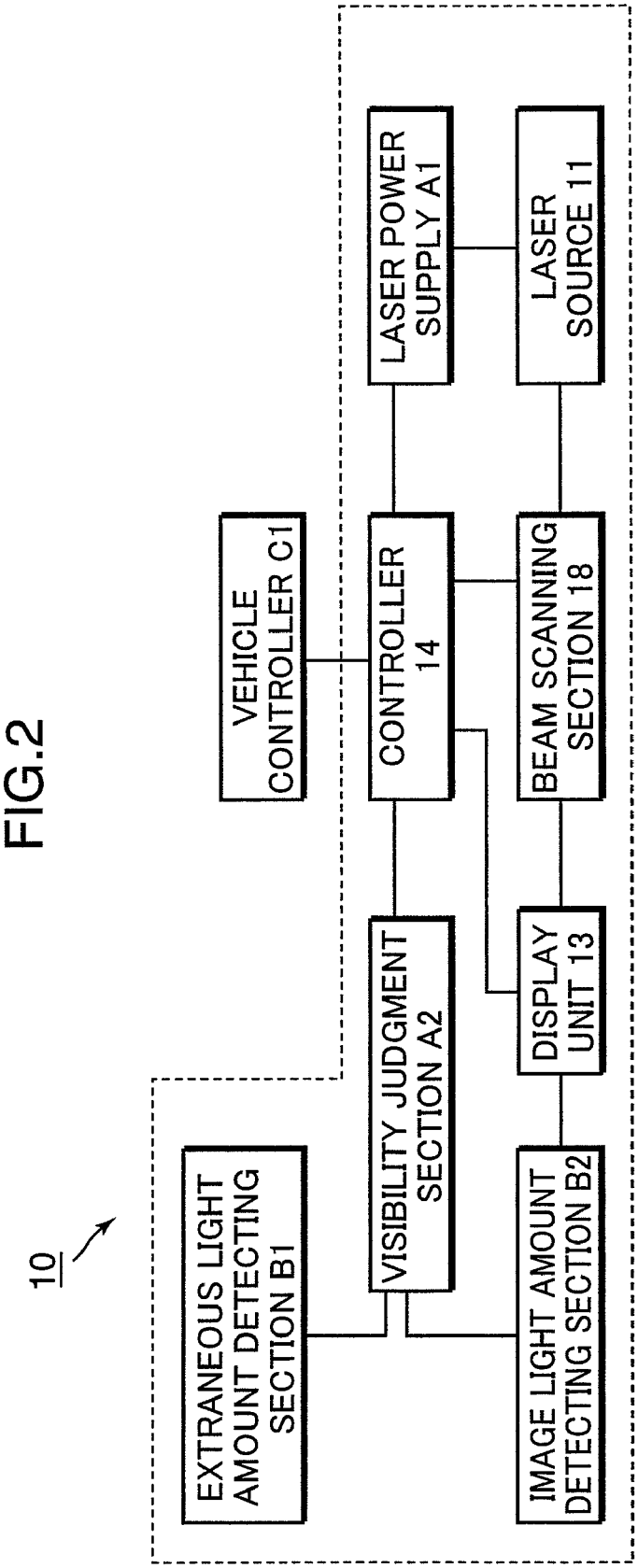

IMAGE DISPLAY APPARATUS INCLUDING A CONTROLLER THAT CONTROLS A LIGHT AMOUNT REGULATING FILM BASED ON AN AMOUNT OF EXTRANEOUS LIGHT RECEIVED BY A LIGHT RECEIVING ELEMENT

BACKGROUND OF THE INVENTION

1. Field of the Invention

The present invention relates to an image display apparatus for displaying an image using fluorescent light produced with an application of display-use laser light.

2. Description of the Background Art

A display apparatus for use in a vehicle displays information concerning the vehicle mainly to a driver on an analog instrument or a digital instrument. The on-board display apparatus uses a display method employing an analog-type pointer or indicator or a display method employing a digital-type LED or electron tube having a combination of segments and is arranged to reliably present in real time various kinds of vehicle-related information which vary from time to time.

The driver, on the other hand, is required to recognize a situation outside the vehicle during driving, read the information displayed on the on-board display apparatus and perform maneuvers, for instance, safely and quickly. For the foregoing requirements, it is preferable that the information necessary for the driver to recognize the situation outside the vehicle during driving be displayed on the on-board display apparatus within a range where the driver's eyesight moves. Therefore, a development of, for example, an image display apparatus capable of displaying a text or an image by projecting laser light on part of a transparent plate like a windshield of the vehicle is desired.

As one example of the foregoing image display apparatuses, an image display apparatus which displays information with regard to the vehicle being driven, navigational information, or the like on a windshield of the vehicle as a screen using laser light has been proposed. Specifically, for example, an information display area is provided on an inner surface of the windshield of a vehicle, and a display film, which is made of transparent resin containing fluorescent pigment and which gives off light of a desired wavelength is formed in the information display area. The information with regard to the vehicle is displayed on the display film using blue laser light incident thereon (to be referred to Japanese Unexamined Patent Publication No. 2000-168352, for example). With the display apparatus of the foregoing structure, the laser light is scanned over the display film while controlling amounts of transmitted light and reflected light to realize a display screen of improved definition and luminance, thereby realizing an image display apparatus which the driver can view information displayed thereon with ease.

Another example of the image display apparatus has been proposed wherein information is displayed on a translucent reflecting plate on the windshield of the vehicle, and a plurality of switches used in the vehicle are displayed on the translucent reflecting plate in such a manner that the driver of the vehicle can switch ON/OFF the switches as desired with a small number of eyesight movements and within a range of the eyesight movements (to be referred to Japanese Unexamined Patent Publication No. 1996-76050, for example). With this structure, the driver can promptly recognize the situation outside the vehicle or the information with regard to the vehicle, thereby permitting the driver to perform driving safely.

According to the foregoing conventional structures, however, with the sunlight which directly enters inside of the vehicle through the windshield lightens the vehicle interior, and therefore a difference in brightness between an image or the like displayed on a display screen and the vehicle interior becomes smaller, which makes it hard to see the displayed information. Furthermore, the information display area on the surface of the windshield is formed with the display film made of the transparent resin containing the fluorescent pigment. Therefore, ultraviolet rays contained in sunlight which directly enters the vehicle interior through the windshield may excite the fluorescent pigment within the transparent resin, which may cause such problem that a light may be emitted from an unintended area, thereby presenting a problem in that necessary information may not be displayed clearly.

Additionally, while the foregoing conventional structures utilize a laser source as a light source, the maintenance of safety has not been taken into consideration, in the point of preventing the driver's or passenger's eyes from having a laser beam entered therein resulting from the laser beam reflected or scattered from an non-intended or unexpected part.

SUMMARY OF THE INVENTION

It is an object of the present invention to provide an image display apparatus capable of displaying high-contrast images by eliminating adverse influence of extraneous light.

In order to achieve the foregoing object of the present invention, an image display apparatus according to one aspect of the present invention includes a laser source for emitting ultraviolet or blue display-use laser light having a wavelength of 420 nm or less, and a display unit including a fluorescent light generating section for generating fluorescent light when irradiated with the display-use laser light, wherein the display unit displays an image using the fluorescent light generated by the fluorescent light generating section, wherein the display unit further includes an extraneous light shielding section for shielding an extraneous light which is emitted from a back side of the display unit and which has a wavelength in a range where the fluorescent light is generated so as to prevent the extraneous light from entering in the fluorescent light section.

In the image display apparatus provided with the display unit which displays the image using the fluorescent light generated when irradiated with the display-use laser light, in an event that an extraneous light component having a wavelength in a range where the fluorescent light is generated is incident on the display unit from the back side thereof, the fluorescent light is generated not only from the display-use laser light but also from the extraneous light. Consequently, an overall amount of fluorescent light for use in display becomes too large, resulting in a lower contrast display of the display unit.

In contrast, according to the foregoing structure of the present invention, the display unit is provided with the extraneous light shielding section for shielding an extraneous light which is emitted from a back side of the display unit and which has a wavelength in a range where the fluorescent light is generated so as to prevent the extraneous light from entering in the fluorescent light section which generates the fluorescent light for use in display. According to the foregoing structure, the fluorescent light generating section can generate the fluorescent light without being affected by the extraneous light, thereby realizing the display unit capable of displaying a highly visible image (including text data) free from speckle noise with high contrast.

These and other objects, features and noteworthy aspects of the present invention will be more fully understood from the following detailed description, and advantages of the invention will become readily apparent from the detailed description when read in conjunction with the accompanying drawings.

BRIEF DESCRIPTION OF THE DRAWINGS

FIG. 1 is an explanatory view showing the schematic structure of a vehicle equipped with an image display apparatus according to a first embodiment of the present invention;

FIG. 2 is a functional block diagram showing the structure of the image display apparatus according to the first embodiment of the present invention;

DETAILED DESCRIPTION OF THE PREFERRED EMBODIMENTS OF THE INVENTION

Embodiments of the present invention are described with reference to the accompanying drawings hereinbelow.

First Embodiment

An image display apparatus according to the first embodiment of the invention is described with reference to FIGS. 1 to 8.

Figure 3A:
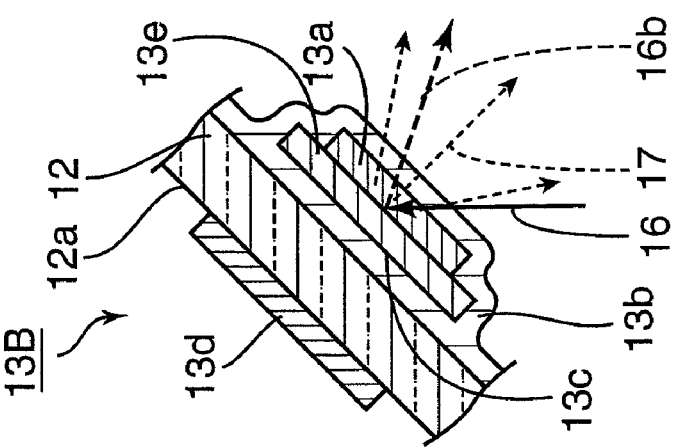
FIG. 3A is an enlarged cross-sectional view showing the schematic structure of a display unit shown in FIG. 1 of the image display apparatus according to the first embodiment of the present invention.
Figure 3B:
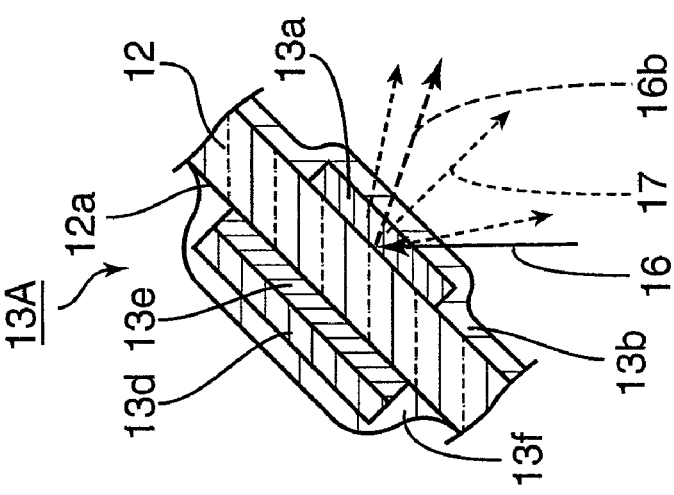
FIG. 3B is an enlarged cross-sectional view showing the schematic structure of another display unit of the image display apparatus according to the first embodiment of the present invention.
Figure 3C:
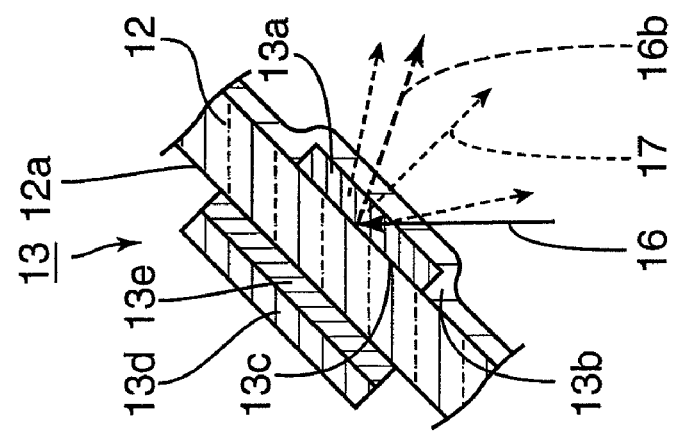
FIG. 3C is an enlarged cross-sectional view showing the schematic structure of still another display unit of the image display apparatus according to the first embodiment of the present invention.
Figure 4A:
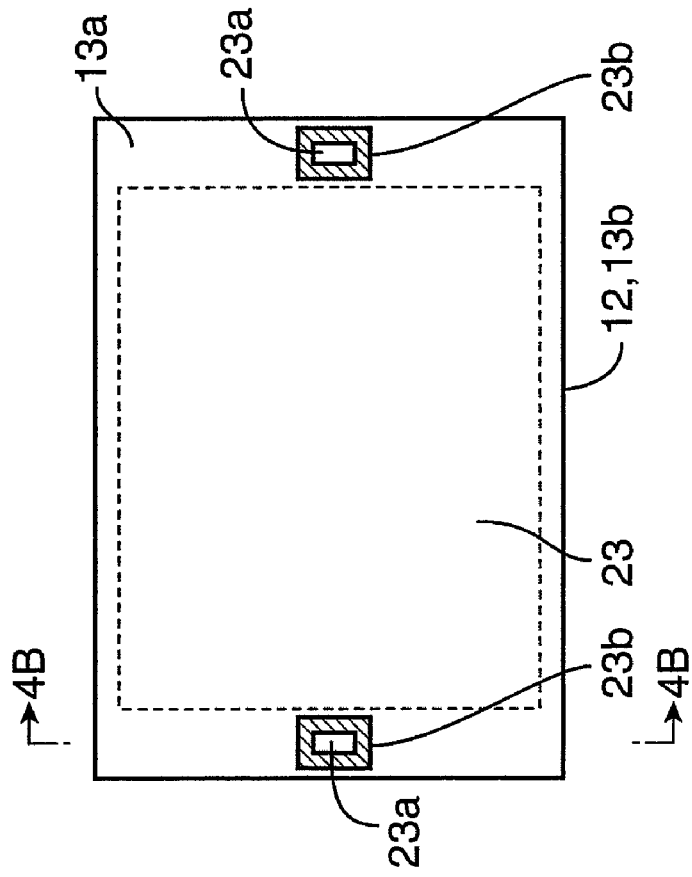
FIG. 4A is a plan view showing the schematic structure of an image light amount detecting section constituting part of the display unit of the image display apparatus according to the first embodiment of the present invention.
Figure 4B:
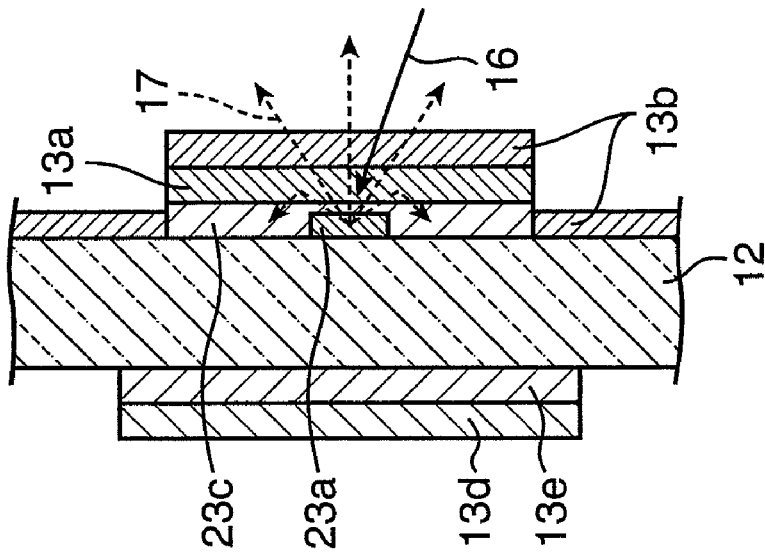
FIG. 4B is a cross-sectional diagram taken along lines 4B-4B of FIG. 4A.

FIG. 1 is an explanatory view showing the schematic structure of a vehicle equipped with the image display apparatus according to the present embodiment. Specifically, FIG. 1 is a schematic cross-sectional diagram formed by cutting the vehicle along a vertical direction between seats for a driver and a person next to the driver, both of whom being occupants of the vehicle, the diagram showing a view including the driver's seat seen across a cutting plane. FIG. 2 is a functional block diagram showing the structure of the image display apparatus according to the present embodiment. FIGS. 3A to 3C are cross-sectional diagrams showing the schematic structure of a display unit according to the present embodiment, FIG. 3A being an enlarged cross-sectional view showing the schematic structure of the display unit of FIG. 1, and FIGS. 3B and 3C being enlarged cross-sectional views showing display units according to variations of the display unit shown in FIG. 1. FIG. 4A is a plan view showing the schematic structure of an image light amount detecting section provided in the display unit of the image display apparatus according to the present embodiment, and FIG. 4B is a cross-sectional diagram taken in an arrow direction of FIG. 4A.

In the vehicle 21 according to the present embodiment, a transparent plate 12 constituting the image display apparatus 10 forms part of a windshield 21a of the vehicle as shown in FIG. 1.

As shown in FIG. 1, the image display apparatus 10 of the present invention includes a laser source 11 for emitting ultraviolet or blue display-use laser light (not shown) 16 having a wavelength of 420 nm or less within an area enclosed by broken lines in the Figure, the display unit 13 for displaying an image (including text data), a beam scanning section (scanning section) 18 for scanning the display-use laser light 16 over the display unit 13, an optical fiber 18a for guiding the display-use laser light 16 emitted from the laser source 11 to the scanning section and a controller 14 for controlling the laser source 11, the display unit 13, the beam scanning section 18, and so on.

The display unit 13 includes a display film (fluorescent light generating section) 13a for generating fluorescent light 17 when irradiated with the display-use laser light 16. The display unit 13 displays the image using the fluorescent light generated by the display film 13a. It is possible to use one of such resins as epoxy, biphenyl, acrylic, polyimide and silicone resins which transmit ultraviolet light and visible light as a material of the display film 13a.

A fluorescent material to be added in the display film 13a may be a material which emits green fluorescent light, such as an organic material in which indium oxide ($In_2O$), zinc oxide (ZnO) or rare-earth-metal nanoclusters doped with tin (Sn) which is an inorganic material having high transparency are dispersed or sphalerite (ZnS) doped with nontransparent copper (Cu), gold (Au) or aluminum (Al).

As mentioned above, the image (including text data) is displayed with a wavelength of green light emission which provides a viewer with the highest visibility and causes less fatigue of the optic nerve when viewed continuously. It is therefore possible to present a highly visible image which causes less fatigue.

The display unit 13 is further provided with the transparent plate 12 serving as part of an extraneous light shielding section on a back side of the display film 13a for blocking that part of extraneous light including sunlight radiated from the side of a back surface 13c of the display unit 13 which is in a wavelength range where fluorescent light is generated so that such extraneous light will not fall upon the display film 13a. The transparent plate 12 is formed to a thickness t and the display film 13a is formed on a display-side main surface 12b of the transparent plate 12.

In an event that an extraneous light component having a wavelength in a range where the fluorescent light is generated is incident on the display unit from the back side thereof, the fluorescent light is generated not only from the display-use laser light but also from the extraneous light. Consequently, an overall amount of fluorescent light for use in display becomes too large, resulting in a lower contrast display of the display unit.

In contrast, the image display apparatus 10 according to the present embodiment is provided with the transparent plate 12 serving as a part of the extraneous light shielding section for shielding an extraneous light having the wavelength in a range where the fluorescent light 17 is generated to prevent such extraneous light from being incident on the display film 13a for generating the fluorescent light 17 for use in display. Therefore, the display film 13a can generate a proper amount of the fluorescent light 17 without being adversely affected by the extraneous light. With this arrangement, it is possible to display a highly visible image (including text data) free from speckle noise with improved luminance and contrast on the display film 13a.

It is possible to use ultraviolet light screening glass of the prior art, such as ultraviolet light screening glass containing Cerium oxide ($CeO_2$) or ultraviolet light screening glass containing tiny metal particles as the transparent plate 12.

The display unit 13 is further provided with an extraneous light filtering film 13e formed on the back side of the display film 13a as a part of the foregoing extraneous light shielding section. A base material which may be used for the extraneous light filtering film 13e is a flexible membrane like polyimide resin or acrylic resin, for example. Also, a single-layer membrane made of metallic chrome, chrome oxide or silicon (Si) or a multilayer membrane made of molybdenum (Mo) and nickel (Ni) containing iron (Fe) and tantalum (Ta), molybdenum (Mo) and nickel (Ni) containing iron (Fe) or molybdenum (Mo) and nickel (Ni) containing zirconium (Zr) may be used as the extraneous light filtering film 13e.

In essence, the extraneous light filtering film (extraneous light shielding section) 13e is formed from a material which shields the extraneous light having a wavelength in a range where the fluorescent light 17 is generated.

As the image display apparatus 10 of the present embodiment is provided with the extraneous light filtering film 13e, the image display apparatus 10 can surely prevent the extraneous light, which has the wavelength in a range where the fluorescent light 17 is generated, from being incident on the display film 13a. For this reason, it is possible to display highly visible image information free from speckle noise with improved luminance and contrast on the display film 13a in more reliable manner.

It is to be noted that both the transparent plate 12 and the extraneous light filtering film 13e have a function of the extraneous light shielding section for blocking the extraneous light having a wavelength in a range where the fluorescent light 17 is generated. However, the present embodiment is not intended to be limited to the foregoing structure, and what is essential is that at least one of the transparent plate 12 and the extraneous light filtering film 13e has the function of the foregoing extraneous light shielding section.

The extraneous light filtering film 13e of the present embodiment is made up of a film with a high light shielding factor for ultraviolet light and blue light of the wavelength of 420 nm or less contained in the extraneous light while having high transmittance for visible light having larger wavelengths than blue light of the 420 nm.

According to the foregoing structure wherein the extraneous light filtering film 13e is provided on the outside of the display film 13a as seen from the occupants of the vehicle 21, it is possible to prevent the extraneous light from outside the vehicle 21 from being incident on the display film 13a. This arrangement serves to avoid the occurrence of image noise caused by fluorescent light generated by the extraneous light. As a result, it is possible to realize such high contrast which permits the image displayed on the display unit 13 of the image display apparatus 10 to be recognized clearly. On the other hand, the extraneous light having a wavelength in a range of visible light having larger wavelengths than blue light of the 420 nm wavelength passes through the display unit 13, so that the driver can see an external view without hindrance to driving. Similarly, the display unit 13 does not present the image in different colors from an actual external view for vehicle passengers as well so that the passengers do not have any uncomfortable feeling.

As shown in FIGS. 3A to 3C and FIGS. 4A and 4B, the display unit 13 is further provided with an antireflective film 13b which is formed so as to cover at least an inside surface of the display film 13a. The antireflective film 13b is arranged so as to permit most of the ultraviolet or blue display-use laser light 16 having the wavelength of 420 nm or less to pass through. Therefore, the display-use laser light 16 projected on the display film 13a passes through the antireflective film 13b and is absorbed by the display film 13a and the transparent plate 12.

In the present embodiment, the power of reflected light 16b is maintained at 50 µW or less taking into consideration the safety of eyes 22a of the vehicle occupants (FIG. 1). While 1 mW or lower power is normally required for Class II laser safety, the power is maintained at 50 µW or less for the sake of safety during driving. This power may be set at a specified value. With the antireflective film 13b thus provided, it is possible to reduce the influence of the reflected light 16b and realize an image display apparatus with due consideration of the maintenance of safety in addition to the effect of realizing image display of improved luminance and contrast.

Configured to cover at least the entirety of the inside surface of the display film 13a, the antireflective film 13b has a function of protecting the eyes 22a of the vehicle occupants. In the present embodiment, the antireflective film 13b is formed further on the transparent plate 12 in a surrounding inside surface area of the display film 13a as shown in FIGS. 3A to 3C.

It is possible to use a single-layer membrane made of a dielectric material or a multilayer membrane made of two or more alternate layers of a dielectric material having a high refractive index and a dielectric material having a low refractive index, for example, as materials of the antireflective film 13b. $Ta_2O_5$ and $TiO_2$ can be cited as examples of the high refractive index material, while $SiO_2$, $Al_2O_3$, $MgF_2$, as well as fluoroplastic and silicone dioxide resins can be cited as examples of the low refractive index material.

The antireflective film 13b should preferably be formed by mixing in part a photocatalytic material having a photocatalytic effect. By containing the material having the photocatalytic effect, the dust or gas can be removed from the surface of the antireflective film 13b by the photocatalytic reaction produced by an action of the photocatalytic material. It is therefore possible to keep the surface of the antireflective film 13b clean. This arrangement serves to avoid reflection and scattering from the surface of the antireflective film 13b at all times.

The display unit 13 further includes a light amount regulating film 13d formed on the back side of the display film 13a for adjusting the amount of extraneous light like ultraviolet light and visible light contained in sunlight which reaches the display film 13a from outside the vehicle 21. The light amount regulating film 13d is formed on the outside of the extraneous light filtering film 13e. For the light amount regulating film 13d, for example, a thin-film electronic shutter device (e.g., a liquid crystal shutter panel) may be adopted, made up of a film with a plurality of shutters arranged in matrix form wherein a predetermined number of shutters at arbitrary locations are electrically opened and closed to provide a desired amount of lighting or a light shielding membrane having a predetermined visible light transmittance, for example. By forming the light amount regulating film 13d of the foregoing structure on the back side of the display film 13a, it is possible to adjust the amount of extraneous light that reaches the display film 13a serving as the fluorescent light generating section. For this reason, it is possible to properly adjust the amount of extraneous light in relation to the amount of the display-use laser light 16 projected on the display film 13a, for example.

Described next with reference to the functional block diagram of FIG. 2 is control operations performed by the controller 14 provided in the image display apparatus 10 according to the present embodiment, wherein at least the amount of extraneous light passing through the light amount regulating film 13d is adjusted.

As shown in FIG. 2, the image display apparatus 10 of the present embodiment includes a laser power supply A1, a visibility judgment section A2, an extraneous light amount sensor B1, the image light amount detecting section B2, the laser source 11, the display unit 13, the beam scanning section 18 and the controller 14 for controlling these elements.

The visibility judgment section A2 compares extraneous light amount data detected by the extraneous light amount sensor B1 and image light amount data detected by the image light amount detecting section B2 and judges contrast between a displayed image and a display screen. The controller 14 is arranged to properly adjust the contrast based on the result of judgment by the visibility judgment section A2.

Here, the contrast can be adjusted by adjusting the optical power of the display-use laser light 16 emitted from the laser source 11 shown in FIG. 1, for example. The controller 14 adjusts the optical power of the display-use laser light 16 by controlling the laser power supply A1 and the laser source 11 based on such information as light amount data on various kinds of extraneous light and the image output from the visibility judgment section A2 as well as the contrast judgment result as seen above.

The extraneous light amount sensor B1 detects the amount of extraneous light for obtaining clear-cut contrast. The extraneous light amount sensor B1 continuously detects the amount of light on the outside of the vehicle 21 by a light receiving element 19 shown in FIG. 1, or the like, and transmits a detected signal to the visibility judgment section A2.

The light receiving element 19 is provided on the back side 12a of the display film 13a as shown in FIG. 1. The controller 14 controls the light amount regulating film 13d based on the amount of extraneous light including sunlight 15 received by the light receiving element 19 and thereby adjusting the amount of extraneous light passing through the light amount regulating film 13d. More specifically, the light receiving element 19 may be provided outside the vehicle 21 in an area adjacent to the display unit 13 provided in vicinity of the windshield 21a or on a hood (not shown), for example.

A light-sensitive surface of the light receiving element 19 may suffer a change in photosensitivity due to adhesion of atmospheric dust, rainwater or water from snow, or adhesion of snow. Thus, to keep the light-sensitive surface clean by avoiding adhesion of dust or rainwater, the light receiving element 19 may be arranged so as to include a material having a photocatalytic effect in a material of the light-sensitive surface or in a surface layer thereof, for instance. Alternatively, a transparent film formed by blending a material having a photocatalytic effect may be adhered to the light-sensitive surface.

Extraneous light projected from the back side of the display unit 13 mainly refers to the sunlight 15 from the sun 15a in the daytime, while mainly referring to visible light, ultraviolet light, and so on, from lighting equipment and vehicle headlights at nighttime.

According to the structure of the present embodiment provided with the light amount regulating film 13d on the back side of the display film 13a, it is possible to properly adjust the amount of extraneous light in relation to the amount of the display-use laser light 16 projected on the display film 13a. Thus, it is possible to more reliably prevent the adverse effect of extraneous light having a wavelength in a range where fluorescent light is generated by adjusting the amount of extraneous light by the light amount regulating film 13d and blocking the extraneous light having a wavelength in the range where the fluorescent light 17 is generated by the display film 13a (due to the working of the extraneous light shielding section like the transparent plate 12). As a result, it is possible to display a highly visible image free from speckle noise with improved luminance and contrast on the display film 13a in more reliable manner.

The display unit according to the present embodiment may be configured like a display unit 13A shown in FIG. 3B or a display unit 13B shown in FIG. 3C, for example.

The display unit 13A (FIG. 3B) is arranged such that a protective film 13f is formed so as to cover the light amount regulating film 13d and the extraneous light filtering film 13e.

The display unit 13B (FIG. 3C) is arranged such that the extraneous light filtering film 13e is formed between the display film 13a and the transparent plate 12, and the antireflective film 13b is formed so as to cover the entirety of the extraneous light filtering film 13e and the display film 13a.

As shown in FIG. 3A, the display-use laser light 16 is converged within the display film 13a so that the fluorescent light 17 can be efficiently generated from the display film 13a due to the display-use laser light 16 thus converged. It is needless to mention that an improved spatial resolution can be realized with this structure.

As shown in FIGS. 4A and 4B, the image light amount detecting section B2 includes fluorescent light sensing devices 23a and light amount sensing regions 23b located next to the fluorescent light sensing devices 23a. At least one fluorescent light sensing device 23a is provided within an area of the display unit 13 on the surface of the transparent plate 12 inside the vehicle 21 in a manner as if surrounded by transparent adhesive 23c as illustrated in FIG. 4B. In the present embodiment, one each fluorescent light sensing device 23a is provided at left and right in an outer periphery of an image display area 23 of the display unit 13. The fluorescent light sensing devices 23a detect part of the fluorescent light 17 generated by the display film 13a when irradiated with the display-use laser light 16. On the other hand, the light amount sensing regions 23b detect part of the laser light (not shown) scanned over the display film 13a by means of sensing devices (not shown).

The controller 14 may be arranged so as to control that part of functions and operations of the beam scanning section 18 and the display unit 13 which are related to the display-use laser light 16 and the image light amount data where necessary. The controller 14 which is electrically controlled by a vehicle controller C1 in the entirety of the vehicle 21 exchanges various kinds of information with the vehicle controller C1. The vehicle controller C1 is for processing various kinds of information inside and outside the vehicle 21 while controlling the vehicle 21 itself.

It is to be noted that the laser power supply A1 and the visibility judgment section A2 may be so configured as to be provided inside the controller 14 shown in FIG. 1.

The laser source 11 is attached to a metal part having a good heat-dissipating property under a seat 20, for example. It is possible to realize operation with low power consumption and high reliability by efficiently dissipating heat generated from the laser source 11 to the entirety of the vehicle.

In the image display apparatus 10 of the present embodiment, the laser source 11 is provided under a dash panel 21b or the seat 20 as shown in FIG. 1. Thus, the display-use laser light 16 emitted from the laser source 11 is guided to the beam scanning section 18 for scanning the display-use laser light 16 over the display unit 13 by an optical fiber 11a.

According to the foregoing structure employing the optical fiber 11a, it is possible to locate the laser source 11 on a metal part or the like having a good heat-dissipating property under the dash panel 21b or the seat 20, for example. This makes it possible to realize the on-board image display apparatus 10 capable of preventing a problem caused by heat generation by the laser source 11 with high degree of freedom in arrangement. Also, it is possible to realize operation with low power consumption and high reliability by efficiently dissipating the heat generated from the laser source 11 to the entirety of the vehicle.

Also, if the laser source 11 is placed at a location where a favorable heat-dissipating environment is offered or at a location where the laser source 11 can easily be stored as in the foregoing arrangement, it is possible to effectively dissipate the heat generated by the laser source 11. This permits the laser source 11 to operate with low power consumption for a long period of time at a temperature close to room temperature.

Furthermore, the image display apparatus 10 of the present embodiment has a below-described structure as a safety device for avoiding a problem that the display-use laser light 16 could fall upon the eyes 22a of the occupants of the vehicle 21. Specifically, the image display apparatus 10 is provided with a sensor mechanism (not shown) for detecting a proper position and an anomaly of tension exerted on each seat belt when the same is used and the controller 14 (FIGS. 1 and 2) controls a power cutoff mechanism so as to activate a function to block the display-use laser light 16 and cut off the laser source 11 when any seat belt is not properly used based on sensing results of the sensor mechanism.

According to the foregoing structure, it is possible to avoid the problem that the display-use laser light 16 could fall upon the eyes 22a of the occupants of the vehicle 21 when the seat belt is not used. This makes it possible to realize an on-board image display apparatus which permits safe and secure driving of the vehicle.

Also, as shown in FIG. 1, the on-board image display apparatus 10 of the present embodiment is provided with a display-use laser light shield 22c for screening the display-use laser light as another structure for the safety of the eyes of the vehicle occupants. This display-use laser light shield 22c is provided between a scanning space 18a through which the display-use laser light 16 from the beam scanning section 18 is scanned over the display unit 13 and a visual space 22b in which the eyes 22a of the vehicle occupants in the driver's seat 22 and the seat next thereto (not shown) are located.

The display-use laser light shield 22c has a function of preventing the display-use laser light 16 scanned by the beam scanning section 18 from entering the visual space 22b of the occupants of the vehicle 21.

According to the foregoing structure provided with the display-use laser light shield 22c, it is possible to prevent the display-use laser light 16 from entering the eyes 22a of the occupants of the vehicle 21 and thereby realize the on-board image display apparatus 10 which permits safe and comfortable driving even when the display-use laser light 16 is unexpectedly reflected or scattered.

It is needless to mention that the foregoing individual safety devices are applicable to the present embodiment which is further described hereunder.

Next, an optical system including the laser source 11 of the image display apparatus 10 of the present embodiment is described hereinbelow with reference to FIGS. 5 to 8.

Figure 5:
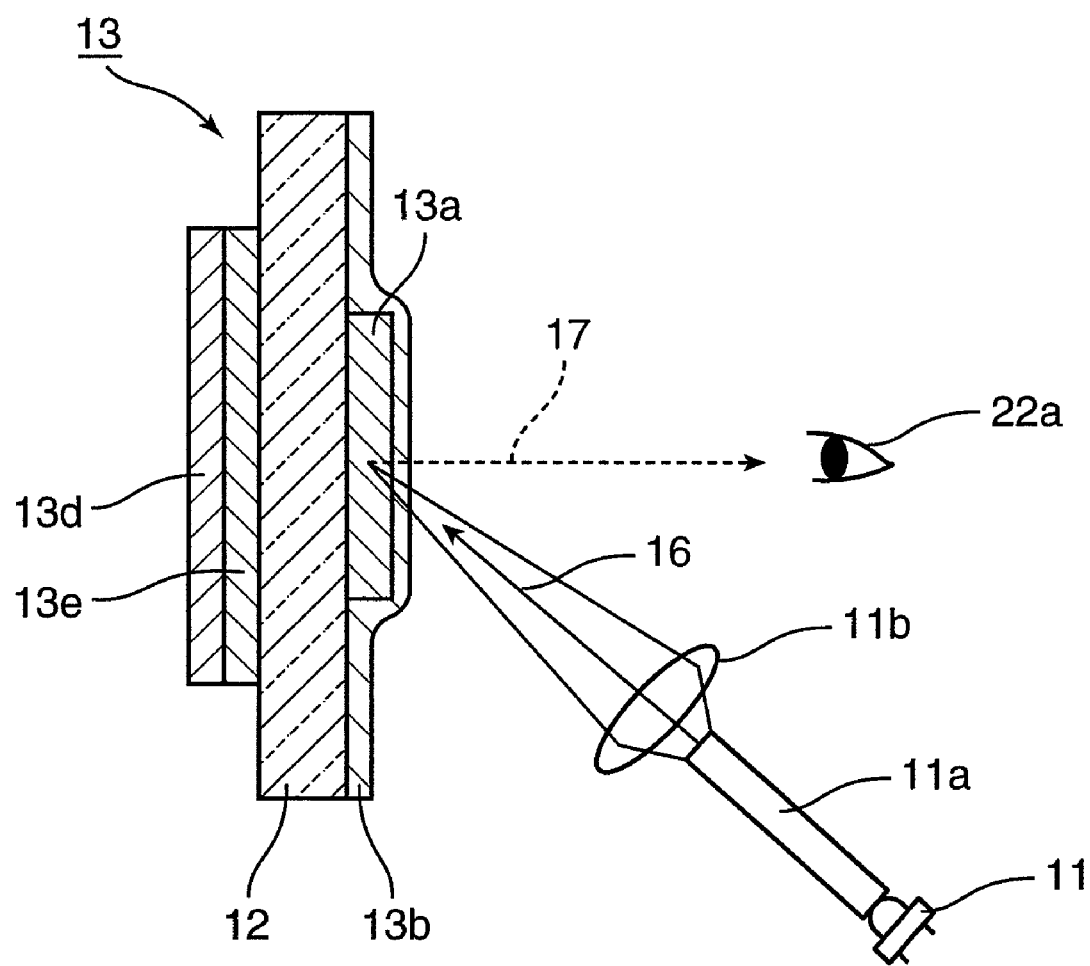
FIG. 5 is an explanatory view showing the schematic structure of an optical system in the vicinity of the display unit provided in the image display apparatus according to the first embodiment of the present invention.
Figure 6:
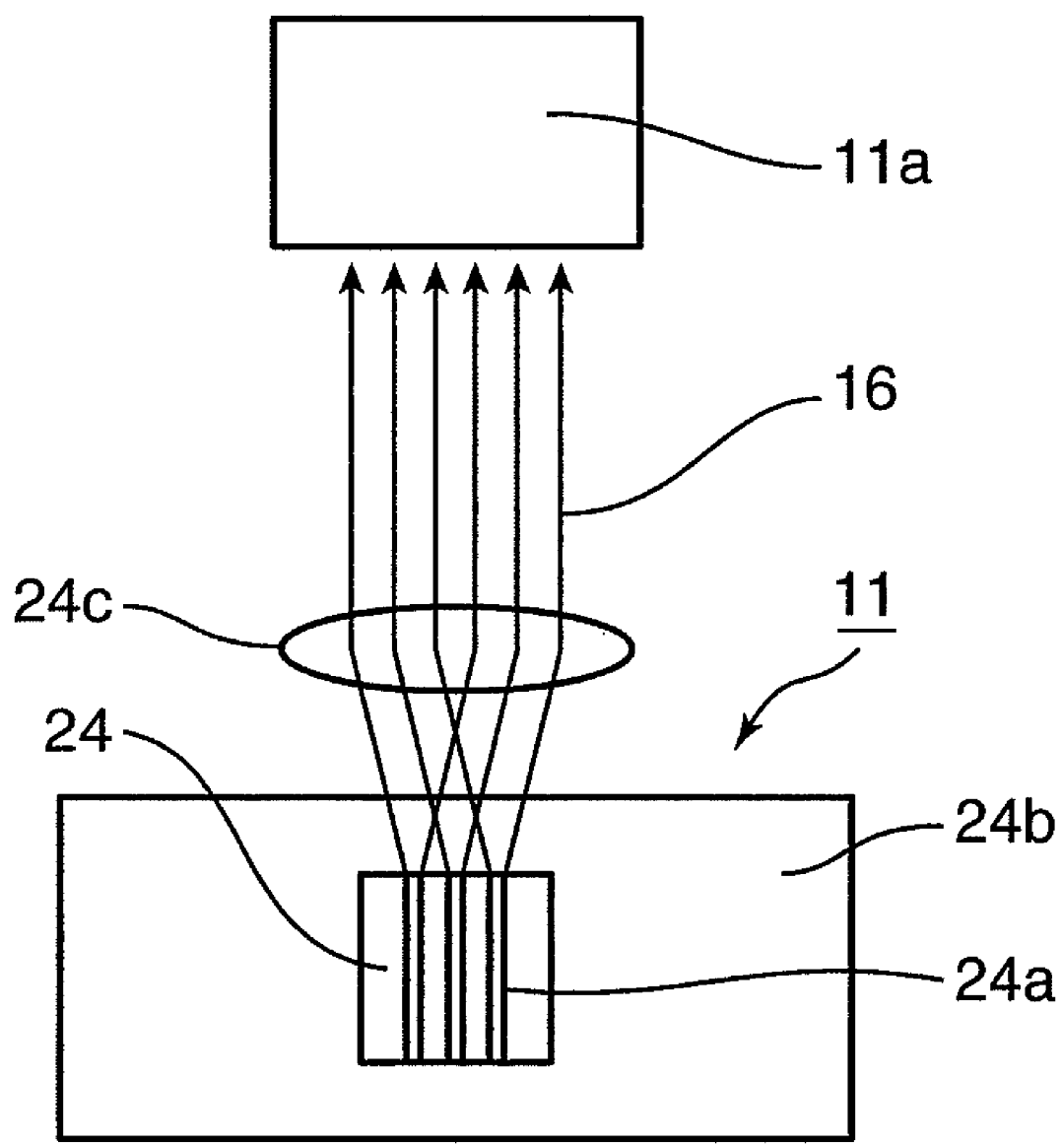
FIG. 6 is an explanatory view showing the schematic structure of the optical system in the vicinity of a laser source provided in the image display apparatus according to the first embodiment of the present invention.
Figure 7:
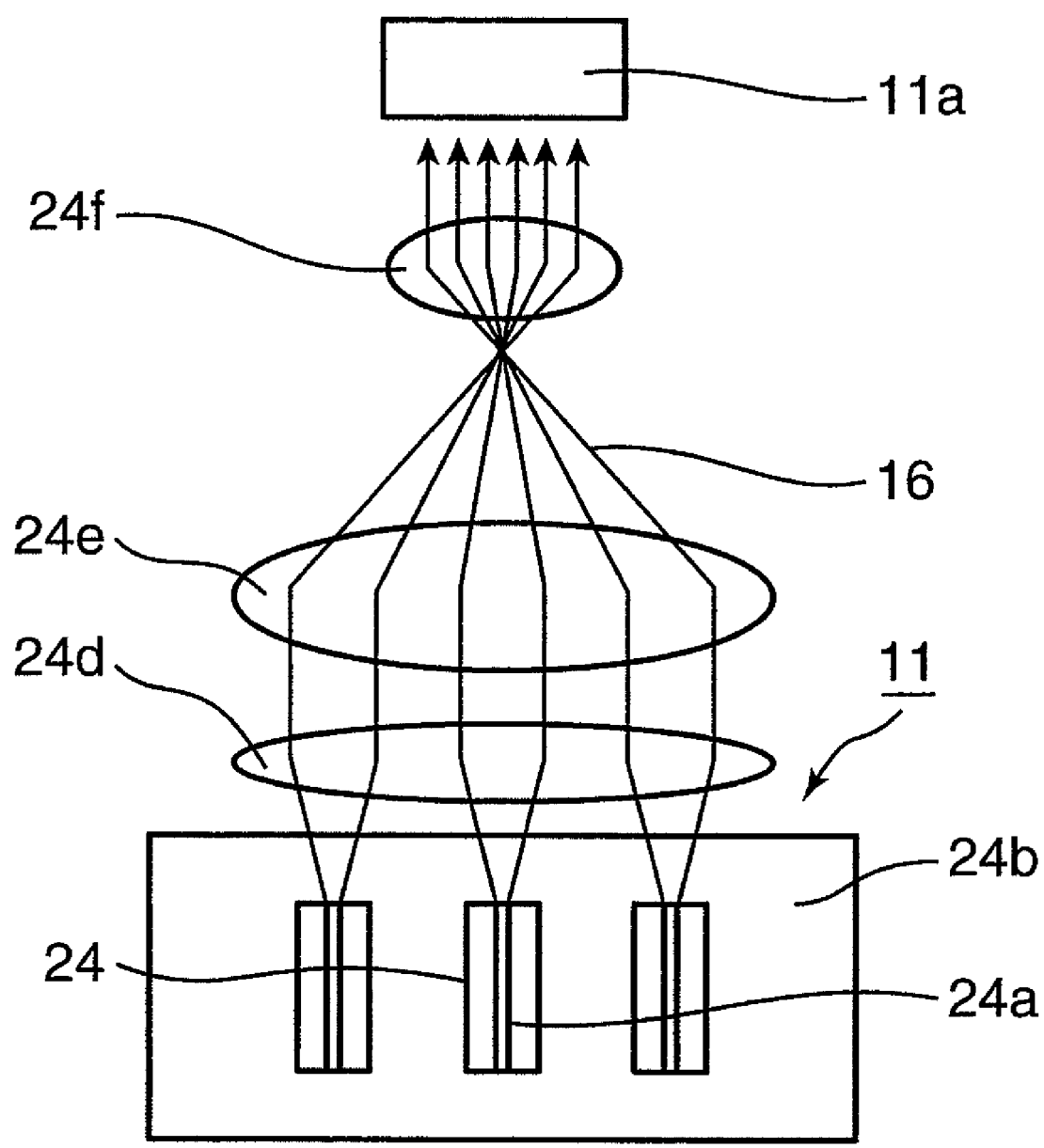
FIG. 7 is an explanatory view showing the schematic structure of another optical system in the vicinity of a laser source provided in the image display apparatus according to the first embodiment of the present invention.
Figure 8:
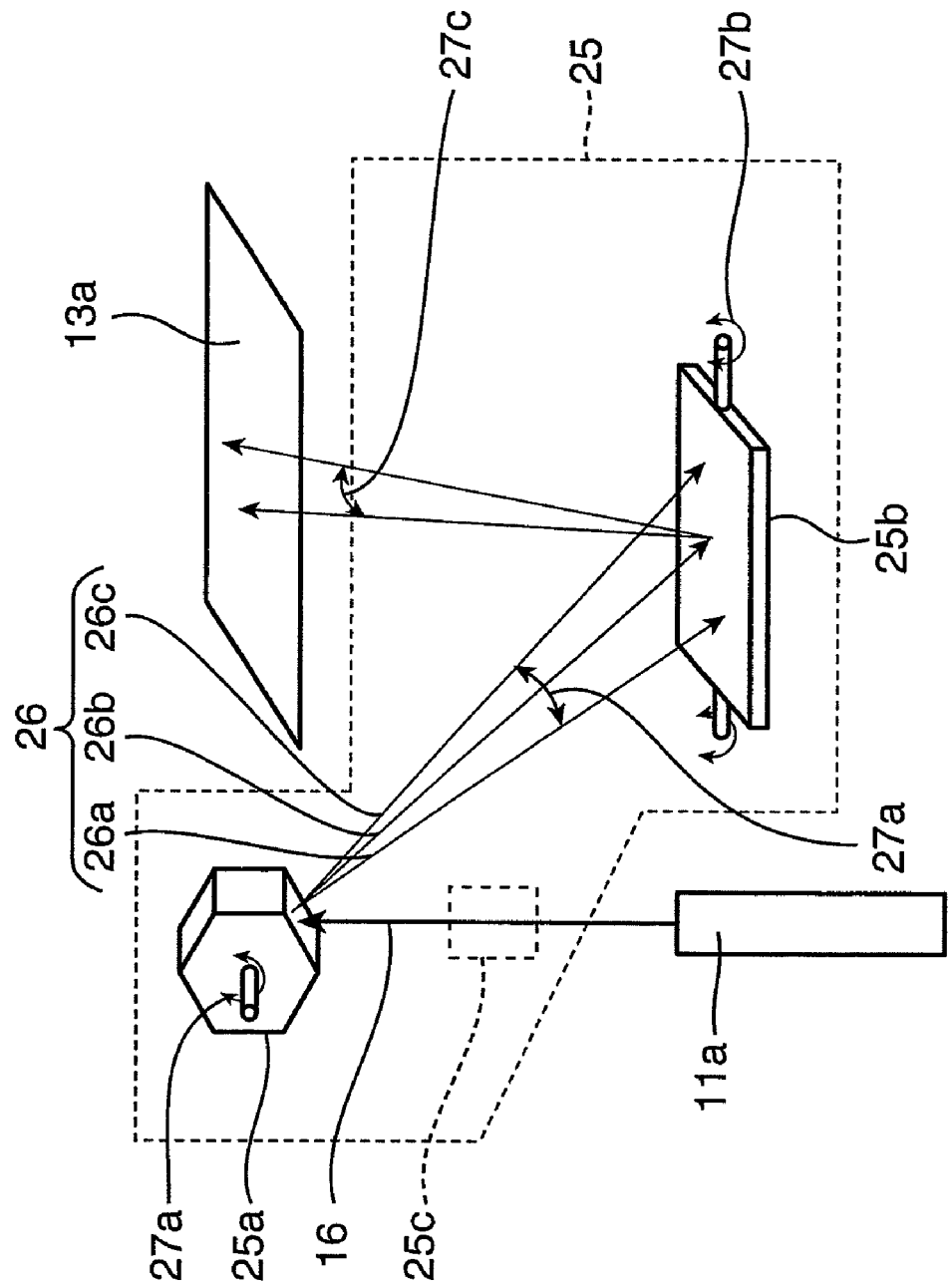
FIG. 8 is an explanatory view showing the schematic structure of the optical system including a display-use laser light scanning section provided in the image display apparatus according to the first embodiment of the present invention.

FIG. 5 is an explanatory view showing the schematic structure of the optical system in the vicinity of the display unit provided in the image display apparatus according to the present embodiment. FIG. 6 is an explanatory view showing the schematic structure of the optical system in the vicinity of the laser source provided in the image display apparatus according to the present embodiment. FIG. 7 is an explanatory view showing the schematic structure of another optical system in the vicinity of the laser source provided in the image display apparatus according to the present embodiment. FIG. 8 is an explanatory view showing the schematic structure of the optical system including the display-use laser light scanning section provided in the image display apparatus according to the present embodiment.

The laser source 11 provided in the image display apparatus 10 of the present embodiment emits the ultraviolet or blue display-use laser light 16 having a wavelength of 420 nm or less (this example uses 420 nm) as previously mentioned.

As shown in FIG. 5, the display-use laser light 16 emitted from the laser source 11 is guided by the optical fiber 11a and gradually converged by a lens 11b to focus within the display film 13a of the display unit 13. The display film 13a displays an image using the fluorescent light 17 generated by projecting the display-use laser light 16, and the image is recognized by the eyes 22a of the vehicle occupants.

It is to be noted that a scanning system for scanning the display-use laser light 16 is not illustrated in FIG. 5 for the sake of explanation.

Next, the optical system in the vicinity of the laser source 11 is described with reference to FIG. 6.

The optical system shown in FIG. 6 is provided with the laser source 11 and the optical fiber 11a coupled to each other. As shown in FIG. 6, the laser source 11 is provided with a semiconductor laser device 24 having a plurality of striped active regions 24a. The semiconductor laser device 24 is soldered to a metal plate 24b having a good heat-dissipating property to establish mechanical and electrical connections. Individual beams of the display-use laser light 16 emitted from the plurality of active regions 24a are converged by a lens 24c and efficiently input into the optical fiber 11a.

With the structure wherein laser light emitted from a single active region is used as the display-use laser light, the amount of light scanned over the display unit of the image display apparatus is insufficient. In response, the laser source 11 of the present embodiment is arranged so as to include the plurality of active regions 24a to ensure a sufficient amount of the display-use laser light 16 required for scanning. Furthermore, since the semiconductor laser device 24 is connected to the metal plate 24b having the good heat-dissipating property, it is possible to suppress temperature increase of the semiconductor laser device 24 even when emitting watt-order output light.

It is therefore possible to use the high-power laser source 11 having an excellent light converging property which can operate with a low operating current. Furthermore, if the distance between the adjacent striped active regions 24a is set to a few micrometers, it is possible to operate the semiconductor laser device 24 as a laser array in which phases of laser light emitted by the individual active regions 24a are interlocked. The semiconductor laser device 24 which scans as this kind of laser array emits the laser light nearly in a state of parallel light rays with a horizontal spreading angle of a few degrees. It is therefore possible to connect the laser source 11 to the optical fiber 11a by a simple optical system using a cylindrical lens, for instance.

FIG. 7 shows another optical system provided with the laser source 11 and the optical fiber 11a coupled to each other. In FIG. 7, striped active regions 24a are formed in individual semiconductor laser devices 24. For example, the semiconductor laser devices 24 are soldered to a metal plate 24b having a good heat-dissipating property to establish mechanical and electrical connections. Also, the display-use laser light 16 emitted from the separately arranged active regions 24a is coupled to the optical fiber 11a by an optical lens system made of a plurality of lenses 24d, 24e, 24f, for example.

While the amount of light scanned over the display unit of the image display apparatus is insufficient with the structure wherein laser light emitted from a single active region is used as the display-use laser light, the laser source 11 of the present embodiment is arranged such that the plurality of semiconductor laser devices 24 are provided with the respective active regions 24a to ensure a sufficient amount of the display-use laser light 16 required for scanning. Furthermore, since the semiconductor laser devices 24 are connected to the metal plate 24b having the good heat-dissipating property, it is possible to suppress temperature increase of the semiconductor laser devices 24 even when emitting watt-order output light. With this arrangement, it is possible to use the high-power laser source 11 having an excellent light converging property which can operate with a low operating current.

As the metal plate 24b is thermally connected to a metal portion of the vehicle that is maintained at a relatively low temperature, there is provided a good heat-dissipating path. Also, used as the semiconductor laser devices 24 are such semiconductor laser devices made of a GaN-based material that emit ultraviolet or blue laser light having a wavelength of 420 nm or less.

Next, an optical system including the display-use laser light scanning section provided in the image display apparatus 10 of the present embodiment is explained with reference to FIG. 8. This optical system is further provided with a beam scanning section 25 for scanning the display-use laser light 16 over the display film 13a. The display film 13a displays an image using the fluorescent light (not shown) generated by scanning the display-use laser light 16.

As shown by dotted lines in FIG. 8, the beam scanning section 25 is provided with a polygon mirror 25a, a reflecting mirror 25b and a light modulator 25c. As depicted in FIG. 8, the display-use laser light 16 guided by the optical fiber 11a is scanned by the polygon mirror 25a in a direction of an arrow 27a and a scanning light beam 26 (26a, 26b, 26c) thus produced falls upon the reflecting mirror 25b. As the reflecting mirror 25b rotates in a direction of an arrow 27b, the scanning light beam 26 which has fallen upon the reflecting mirror 25b is further scanned in a direction of an arrow 27c which is perpendicular to the direction of the arrow 27b and the scanning light beam 26 thus scanned is incident on the display film 13a.

According to the foregoing structure, it is possible to produce a two-dimensional image with improved luminance and contrast by swiftly scanning the display-use laser light 16 over the display film 13a by means of the beam scanning section 25. Incidentally, it is possible to use a Galvano-mirror (not shown) instead of the polygon mirror 25a for scanning the display-use laser light 16. It may be also arranged so as to scan the display-use laser light 16 while modulating the display-use laser light 16 by using the light modulator 25c for modulating light intensity shown by the broken lines in FIG. 8. In this case, a reflecting mirror capable of rotating in the direction of the arrow 27a should be disposed at the location of the polygon mirror 25a.

It is possible to easily reduce the optical system in size if an optical micro electro mechanical system (MEMS) (micromachine) is used to realize a scanning method. It is also possible to scan the display-use laser light 16 on either of two axes with one device (optical MEMS) in the case where the optical MEMS is adopted in the scanning method.

Second Embodiment

Another embodiment of the present invention is described in the following with reference to the drawings.

An image display apparatus according to the present embodiment has basically a common structure as the image display apparatus of the first embodiment. Accordingly, the following discussion deals with only characteristic parts of the image display apparatus and common parts are designated by the same symbols and a description thereof is omitted as appropriate.

Image display apparatuses for use in vehicles according to the present embodiment are described hereinbelow with reference to FIGS. 9 and 10.

Figure 9:
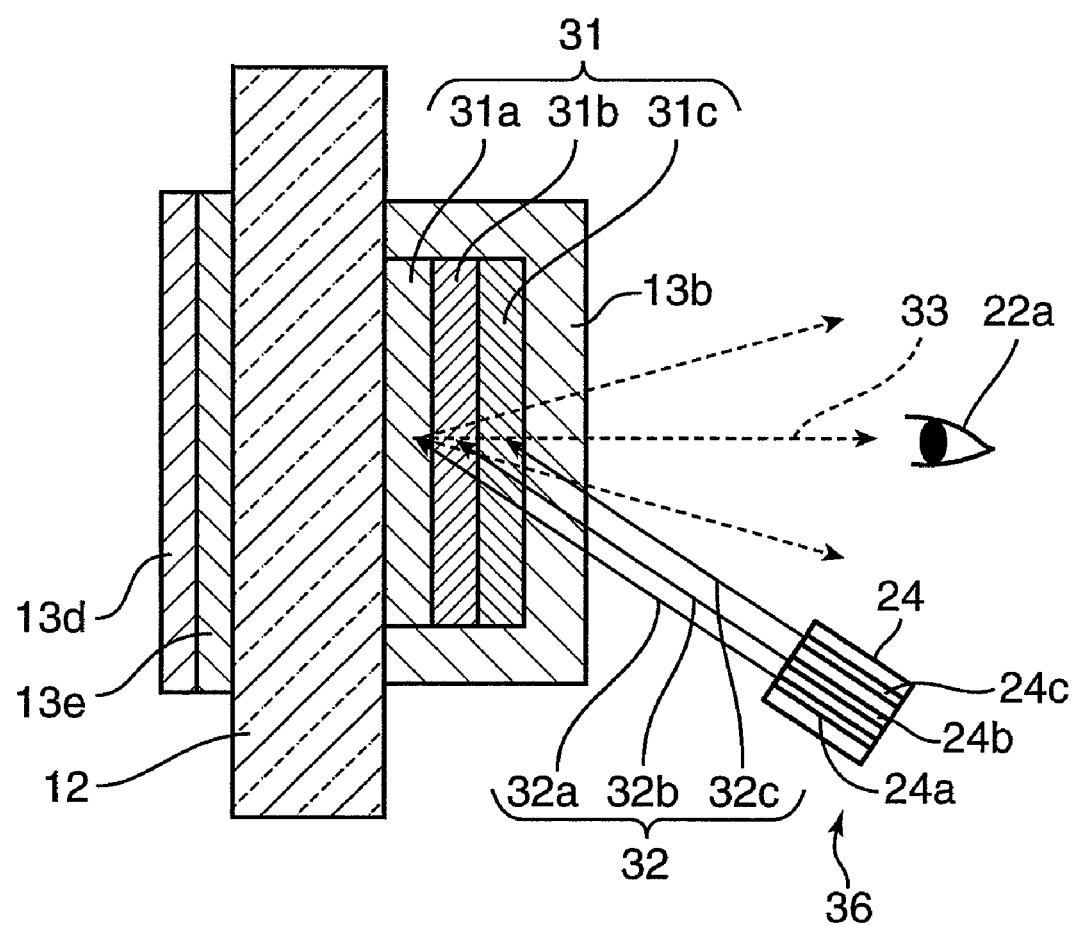
FIG. 9 is a schematic cross-sectional view showing a principal portion of a display unit provided in a color image display apparatus for use in a vehicle according to a second embodiment of the present invention.

FIG. 9 is a schematic cross-sectional view showing a principal portion of a display unit 13 used in an on-board color image display apparatus 30 according to the second embodiment of the present invention. FIG. 10 is an explanatory view showing the structure of an optical system including a display-use laser light scanning section of an image display apparatus 40 capable of color image display according to the present embodiment.

The image display apparatuses according to the present embodiment are image display apparatuses having a capability to display a color image. Thus, these image display apparatuses differ from the image display apparatus 10 of the first embodiment in the structures of the display film and the optical system. The present embodiment is however the same as the first embodiment with respect to the remainder of the basic structure, so that a description of any overlapping part is omitted.

The display unit 13 of the present embodiment is provided with a display film 31 instead of the display film 13a of the first embodiment as shown in FIG. 9. This display film 31 is made up of three layers of transparent membranes containing different fluorescent materials. Specifically, the display film 31 has a laminar structure including a red fluorescing membrane 31a, a green fluorescing membrane 31b and a blue fluorescing membrane 31c which are laminated in this order from the side of a transparent plate 12.

The red fluorescing membrane 31a contains a fluorescent material which produces red fluorescence at a central wavelength close to 610 nm when irradiated with ultraviolet display-use laser light 32a. The green fluorescing membrane 31b contains a fluorescent material which produces green fluorescence at a central wavelength close to 540 nm when irradiated with ultraviolet display-use laser light 32b. The blue fluorescing membrane 31c contains a fluorescent material which produces blue fluorescence at a central wavelength close to 470 nm when irradiated with ultraviolet display-use laser light 32c.

The image display apparatus 30 is provided with a laser source 36 instead of the laser source 11 of the first embodiment.

A semiconductor laser device 24 constituting a principal portion of the laser source 36 used in the present embodiment is provided with striped active regions 24a, 24b and 24c which emit components of the display-use laser light 32a, 32b, 32c in at least three wavelength ranges having different central wavelengths. The central wavelengths of the ultraviolet laser light 32 are 405 nm for the display-use laser light 32a incident upon the red fluorescing membrane 31a, 390 nm for the display-use laser light 32b incident upon the green fluorescing membrane 31b, and 380 nm for the display-use laser light 32c incident upon the blue fluorescing membrane 31c. The display film 31 generates red, green and blue components of fluorescent light when irradiated with these display-use laser light beams.

The components of the display-use laser light 32a, 32b, 32c having the central wavelengths of 405 nm, 390 nm and 380 nm are modulated into color tones representative of an original image by applying modulating signals (not shown) for modulating currents input into the active regions 24a, 24b, 24c of the semiconductor laser device 24 to the respective active regions 24a, 24b, 24c. Also, the display film 31 can generate the red, green and blue components of fluorescent light 33 to produce a color display by irradiation with these display-use laser light components. This makes it possible to realize the image display apparatus 30 capable of displaying color images with improved luminance and contrast.

Furthermore, it is possible to display a two-dimensional color image by using a beam scanning section 35 having the same structure as the beam scanning section 18 of the first embodiment.

Figure 10:
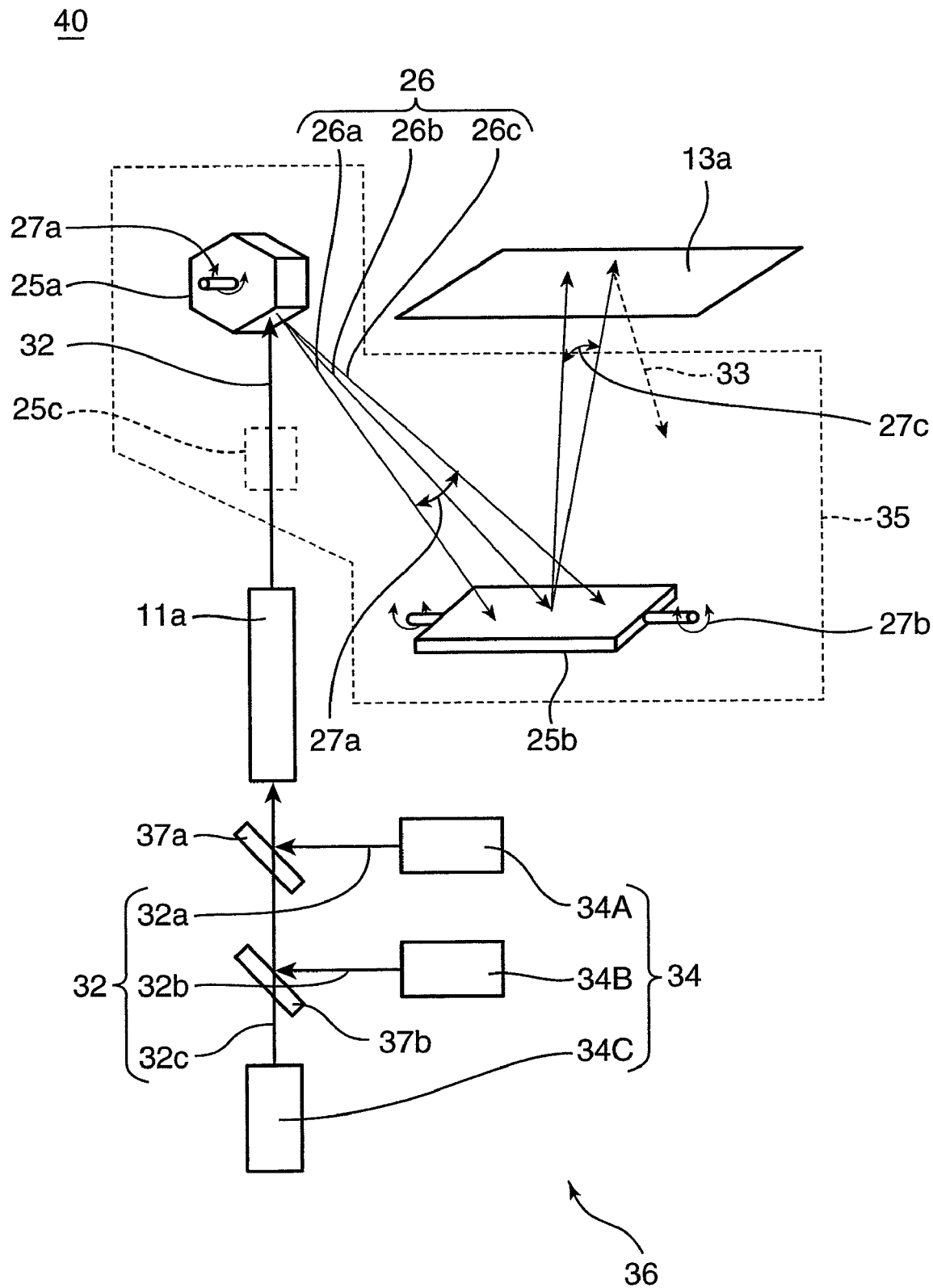
FIG. 10 is an explanatory view showing the schematic structure of an optical system including a scanning section provided in a color image display apparatus for use in a vehicle according to the second embodiment of the present invention.

FIG. 10 illustrates the image display apparatus 40 as another example structure of the image display apparatus according to the present embodiment. The image display apparatus 40 differs from the image display apparatus 30 of FIG. 9 in that the laser source 36 is provided with three semiconductor laser devices 34A, 34B and 34C for emitting components of display-use laser light 32a, 32b, 32c in at least three wavelength ranges having different central wavelengths. As is the case with the image display apparatus 30 of FIG. 9, the display film 31 displays a color image by using red, green and blue components of fluorescent light 33 generated by irradiation with these components of the display-use laser light 32a, 32b, 32c.

According to the foregoing structure, wavelength components of 420 nm and less of ultraviolet light contained in sunlight is blocked, so that vexatious ultraviolet light components are not excited. Also, it is possible to realize a color image display apparatus for use in a vehicle which can provide a display of improved luminance and contrast even in the vehicle 21 under sunlight.

The laser source of the present embodiment may be provided with the single semiconductor laser device 24 as shown in FIG. 9 or with the plurality of semiconductor laser devices 34A, 34B, 34C as shown in FIG. 10. With the structure shown in FIG. 10, it is possible to combine beams of the display-use laser light 32a, 32b, 32c emitted from the plurality of semiconductor laser devices 34A, 34B, 34C into a single beam of the display-use laser light 32 and input the same into the beam scanning section 35 by means of dichroic mirrors 37a, 37b.

Also, laser beams from three laser sources may be bundled to produce a combined light wave by inputting the beams into separate optical fibers. This makes it possible to realize an image display apparatus which is more excellent in terms of stability.

The foregoing discussion of the present embodiment is based on the assumption that extraneous light wavelengths blocked by the extraneous light shielding section like the transparent plate 12 are 420 nm and less. If the laser source has a transmitting wavelength of 410 nm and there is a possibility that fluorescent light is generated up to a wavelength of 430 nm, for example, the extraneous light shielding section should be configured to block extraneous light wavelengths of 430 nm and less. Also, if the laser source has a transmitting wavelength of 390 nm and there is a possibility that fluorescent light is generated up to a wavelength of 410 nm, the extraneous light shielding section should be arranged to block extraneous light wavelengths of 410 nm and less. With this structure, the display film 31 serving as fluorescent light generating section can generate desired fluorescent light without being adversely affected by extraneous light which can contribute to generating fluorescent light components contained in sunlight, for instance. This makes it possible to prevent a reduction in contrast by extraneous light.

Incidentally, the structure of the image display apparatus can be simplified if an ultraviolet light shielding film serving as an extraneous light shielding section and a display film serving as a fluorescent light generating section are made of organic film sheets and adhered to the transparent plate. In this case, the ultraviolet light shielding film should preferably be adhered to the outside of the transparent plate as seen from the driver's seat. Also, the display film serving as the fluorescent light generating section should preferably be adhered to the inside of the transparent plate as seen from the driver's seat. It is effective for reducing cost to adhere even a single organic film sheet as one of the ultraviolet light shielding film and the display film.

While the image display apparatuses of the foregoing first and second embodiments have been described with reference to examples in which the apparatuses are intended for use in a vehicle, the image display apparatuses of the invention are not limited to in-vehicle applications but are also applicable to other than the in-vehicle applications provided that a display screen is formed on a surface of a transparent plate disposed at a location where extraneous light like sunlight is incident on the transparent plate from a back side thereof.

Also, while the image display apparatuses of the foregoing first and second embodiments have been described with reference to example structures wherein the display film serving as the fluorescent light generating section is scanned by the laser light projected thereupon, it may be arranged such that the laser light is projected on the entirety or part of the display film after being modulated by use of a two-dimensional imaging device to generate fluorescent light and thereby display a text data or an image. A two-dimensional imaging device suited to this application is a reflective digital mirror device (DMD), rather than a transmissive liquid crystal display (LCD). This is because, if ultraviolet light is transmitted through the two-dimensional imaging device, a problem arises such as a reduction in transmittance or deterioration of the LCD by the ultraviolet light. On the other hand, this kind of problem does not occur in the case of the DMD as the ultraviolet light is simply reflected. Additionally, for transmission of laser light from the laser source to the two-dimensional imaging device, it is preferable to guide the laser light up to a point immediately upstream of the two-dimensional imaging device by use of an optical fiber. With this structure, it is possible to install the laser source at a location where a favorable heat-dissipating environment is offered or at a location where the laser source can easily be stored so that heat generated by the laser source can be effectively dissipated. This permits the laser source to operate with low power consumption for a long period of time at a temperature close to room temperature.

As described, an image display apparatus according to one aspect of the present invention includes a laser source for emitting ultraviolet or blue display-use laser light having a wavelength of 420 nm or less, and a display unit including a fluorescent light generating section for generating fluorescent light when irradiated with the display-use laser light, wherein the display unit displays an image using the fluorescent light generated from the fluorescent light generating section, wherein the display unit further includes an extraneous light shielding section for shielding an extraneous light which is emitted from a back side of the display unit and which has a wavelength in a range where the fluorescent light is generated so as to prevent the extraneous light from entering in the fluorescent light generating section.

In the image display apparatus provided with the display unit which displays the image using the fluorescent light generated when irradiated with the display-use laser light, in an event that an extraneous light component having a wavelength in a range where the fluorescent light is generated is incident on the display unit from the back side thereof, the fluorescent light is generated not only from the display-use laser light but also from the extraneous light. Consequently, an overall amount of fluorescent light for use in display becomes too large, resulting in a lower contrast display of the display unit.

In contrast, according to the foregoing structure of the present invention, the display unit is provided with the extraneous light shielding section for shielding an extraneous light which is emitted from the back side of the display unit and which has a wavelength in a range where the fluorescent light is generated so as to prevent the extraneous light from entering in the fluorescent light section which generates the fluorescent light for use in display. According to the foregoing structure, the fluorescent light generating section can generate the fluorescent light without being affected by the extraneous light, thereby realizing the display unit capable of displaying a highly visible image (including text data) free from speckle noise with high contrast.

With the foregoing structure, it is preferable that the extraneous light shielding section includes a transparent plate formed on a back side of the fluorescent light generating section, the transparent plate containing a material which blocks the extraneous light which has the wavelength in a range where the fluorescent light is generated.

With the foregoing structure, it is preferable that the extraneous light shielding section includes an extraneous light filtering film formed on a back side of the fluorescent light generating section, the extraneous light filtering film containing a material which blocks the extraneous light which has the wavelength in a range where the fluorescent light is generated.

According to the foregoing structures, it is possible to more reliably prevent the extraneous light which has the wavelength in a range where the fluorescent light is generated from being incident on the fluorescent light generating section. As a result, it is possible to display a highly visible image (including text data) free from speckle noise with improved luminance and contrast in the display unit under more stable conditions.

With the foregoing structure, it is preferable that the display unit be arranged to further include a light amount regulating film formed on a back side of the fluorescent light generating section for adjusting the amount of the extraneous light which reaches the fluorescent light generating section.

For the foregoing light amount regulating film, for example, a light shielding film having a predetermined visible light transmittance may be adopted.

With the foregoing structure, it is preferable that the image display apparatus be arranged so as to further include a controller for controlling the light amount regulating film, and a light receiving element provided on the back side of the fluorescent light generating section, wherein the controller controls the light amount regulating film based on the amount of the extraneous light received by the light receiving element, thereby adjusting the amount of the extraneous light to be transmitted through the light amount regulating film.

According to the foregoing structure, it is possible to adjust the amount of the extraneous light reaching the fluorescent light generating section by the light amount regulating film formed on the back side of the fluorescent light generating section. It is therefore possible to properly adjust the amount of the extraneous light in relation to the amount of the display-use laser light projected on the fluorescent light generating section. Thus, it is possible to more reliably prevent the adverse effect of the extraneous light having a wavelength in a range where the fluorescent light is generated by adjusting the amount of the extraneous light by the light amount regulating film and blocking the extraneous light having a wavelength in the range where the fluorescent light is generated. As a result, it is possible to display a highly visible image free from speckle noise with improved luminance and contrast in the display unit in more reliable manner.

With the foregoing structure, it is preferable that the display unit further include an antireflective film formed so as to cover at least an inside surface of the fluorescent light generating section.

According to the foregoing structure, the display-use laser light projected on the fluorescent light generating section passes through the antireflective film formed so as to cover at least the inside surface of the fluorescent light generating section and is absorbed by the fluorescent light generating section and the transparent plate. The foregoing structure offers the effect of suppressing the reflection of the display-use laser light, which in turn makes it possible to realize an image display apparatus with due consideration of the maintenance of safety, in addition to the effect of enabling display with improved luminance and contrast without having adverse effects from the reflected light.

With the foregoing structure, it is preferable that the antireflective film contain a material having a photocatalytic effect.

According to the foregoing structure, the dust or gas can be removed from the surface of the antireflective film by the photocatalytic reaction produced by an action of the photocatalytic material contained in the antireflective film. It is therefore possible to keep the surface of the antireflective film clean. This arrangement serves to avoid reflection and scattering from the surface of the antireflective film at all times.

The foregoing antireflective film may have a single-layered or multi-layered structure. Specifically, for example, the antireflective film of a single-layered structure made of a dielectric material having a high refractive index, or the antireflective film of a multilayered structure made of two or more alternate layers of a dielectric material having a high refractive index and a dielectric material having a low refractive index may be adopted. $Ta_2O_5$ and $TiO_2$ can be cited as examples of the high refractive index material, while $SiO_2$, $Al_2O_3$, $MgF_2$, as well as fluoroplastic and silicone dioxide resins can be cited as examples of the low refractive index material.

With the foregoing structure, it is preferable that the laser source be arranged so as to focuses the display-use laser light focuses within the fluorescent light generating section.

According to the foregoing structure, the fluorescent light generating section can efficiently generate the fluorescent light with the display-use laser light thus converged.

With the foregoing structure, it is preferable that the image display apparatus be arranged to further include a scanning section for scanning the display-use laser light over the display unit, wherein the fluorescent light generating section generates the fluorescent light to generate the image as the display-use laser light is scanned over the fluorescent light generating section by the scanning section.

The foregoing laser source should preferably include a semiconductor laser device having a plurality of striped active regions.

According to the foregoing structure, it is possible to realize a high-power laser source having an excellent light converging property.

According to the foregoing structure, it is also possible to produce a two-dimensional image with improved luminance and contrast by swiftly scanning the display-use laser light by the scanning section.

It is preferable that the fluorescent light be green light.

With the foregoing structure, the image (including text data) is displayed with a wavelength of green light emission which provides a viewer with the highest visibility and causes less fatigue of the optic nerve when viewed continuously. It is therefore possible to display a highly visible image which causes less fatigue.

With the foregoing structure, it is preferable that the laser source be arranged to include a semiconductor laser device which emits laser light components in at least three wavelength ranges having different central wavelengths so that the fluorescent light generating section generates red, green and blue components of the fluorescent light when irradiated with the display-use laser light.

According to the foregoing structure, it is possible to display a highly visible color image (including text) free from speckle noise with improved luminance and contrast on the display unit.

With the foregoing structure, it is preferable that the image display apparatus be arranged such that a transparent plate formed on a back side of the fluorescent light generating section constitutes part of a windshield of a vehicle, the image display apparatus further including a scanning section for scanning the display-use laser light over the display unit, and an optical fiber for guiding the display-use laser light emitted from the laser source to the scanning section.

According to the foregoing structure employing the optical fiber, it is possible to provide the laser source on a metal part or the like having a good heat-dissipating property under a dash panel or a seat, for example. This makes it possible to realize an image display apparatus for use in a vehicle capable of preventing a problem caused by heat generation by the laser source with high degree of freedom in arrangement. Also, it is possible to realize operation with low power consumption and high reliability by efficiently dissipating the heat generated from the laser source to the entirety of the vehicle.

With the foregoing structure, it is preferable that the laser source be provided under a dash panel or a seat.

According to the foregoing structure wherein the laser source is provided in a favorable heat-dissipating environment or at a location where the laser source can easily be stored under the dash panel or a seat of the vehicle, it is possible to effectively dissipate heat generated by the laser source. This permits the laser source to operate with low power consumption for a long period of time at a temperature close to room temperature.

With the foregoing structure, it is preferable that the image display apparatus be arranged to further include a display-use laser light shield for preventing the display-use laser light scanned by the scanning section from entering into a visual space of a vehicle occupant.

According to the foregoing structure, it is possible to prevent a problem caused by accidental entering of the display-use laser light into the eyes of the vehicle occupant and thereby realizing an on-board image display apparatus which permits safe and comfortable driving.

With the foregoing structure, it is preferable that the controller be arranged to control the image display apparatus to cut off power supply to the laser source under conditions where a seat belt of the driver's seat or the seat next thereto is not locked to a specific position.

According to the foregoing structure, it is possible to realize an improved on-board image display apparatus in view of the maintenance of safety.

According to the image display apparatus of the present invention, it is possible to display an image with improved luminance and contrast without being affected by extraneous light intensity. Also, when the image display apparatus is used on a vehicle, it is possible to display vehicle-related information or the like necessary for driving in part of the windshield of the vehicle. This makes it unnecessary for the driver to greatly move the eyesight during driving, enabling the driver to drive the vehicle in safe and comfortable manner.

Furthermore, according to the foregoing image display apparatus, the vehicle-related information or the like necessary for driving is displayed in part of the windshield. The driver is therefore not required to greatly move the eyesight during driving. Additionally, as image information or the like is displayed with improved luminance and contrast without being affected by the intensity of the extraneous light, the image display apparatus permits safe and comfortable driving of the vehicle. Therefore, the foregoing image display apparatus is suited for vehicles or other transportations.

This application is based on Japanese Patent Application No. 2007-297572 filed on Nov. 16, 2007, the contents of which are hereby incorporated by reference.

The specific embodiments and arrangements discussed in the foregoing detailed description of the invention are intended solely for revealing technical essence of the present invention. Accordingly, the invention should not be construed as being limited to these illustrative examples, but can be carried out in a variety of modified forms within the spirit of this invention and the scope of the appended claims.

What is claimed is:
1. An image display apparatus comprising:
   a laser source for emitting ultraviolet or blue display-use laser light having a wavelength of 420 nm or less;

a display unit including a fluorescent light generating section for generating fluorescent light when irradiated with the display-use laser light, wherein said display unit displays an image using the fluorescent light generated by said fluorescent light generating section, a controller for controlling a light amount regulating film; and a light receiving element provided on a back side of said fluorescent light generating section;

wherein said display unit further includes an extraneous light shielding section for shielding an extraneous light which is emitted from a back side of said display unit and which has a wavelength in a range where the fluorescent light is generated so as to prevent said extraneous light from entering in said fluorescent light generating section, and said light amount regulating film formed on the back side of said fluorescent light generating section for adjusting the amount of the extraneous light which reaches said fluorescent light generating section; and said controller controls said light amount regulating film based on the amount of the extraneous light received by said light receiving element, thereby adjusting the amount of the extraneous light to be transmitted through said light amount regulating film.

2. The image display apparatus according to claim 1, wherein:

said extraneous light shielding section includes a transparent plate formed on the back side of said fluorescent light generating section, said transparent plate containing a material which blocks the extraneous light which has the wavelength in a range where the fluorescent light is generated.

3. The image display apparatus according to claim 1, wherein:

said extraneous light shielding section includes an extraneous light filtering film formed on the back side of said fluorescent light generating section, said extraneous light filtering film containing a material which blocks the extraneous light which has the wavelength in a range where the fluorescent light is generated.

4. The image display apparatus according to claim 1, wherein:

said display unit further includes an antireflective film formed so as to cover at least an inside surface of said fluorescent light generating section.

5. The image display apparatus according to claim 4, wherein:

said antireflective film contains a material having a photocatalytic effect.

6. The image display apparatus according to claim 4, wherein:

said antireflective film has a single-layered or multi-layered structure.

7. The image display apparatus according to claim 1, wherein:

said laser source focuses the display-use laser light focuses within said fluorescent light generating section.

8. The image display apparatus according to claim 1 further comprising:

a scanning section for scanning the display-use laser light over said display unit, wherein said fluorescent light generating section generates the fluorescent light for use in displaying the image by scanning the display-use laser light over said fluorescent light generating section by said scanning section.

9. The image display apparatus according to claim 1, wherein:

said laser source includes a semiconductor laser device having a plurality of striped active regions.

10. The image display apparatus according to claim 1, wherein:

the fluorescent light is green light.

11. The image display apparatus according to claim 1, wherein:

said laser source includes a semiconductor laser device which emits laser light components in at least three wavelength ranges having different central wavelengths so that said fluorescent light generating section generates red, green and blue components of the fluorescent light when irradiated with the display-use laser light.

12. The image display apparatus according to claim 1, wherein:

a transparent plate formed on the back side of said fluorescent light generating section constitutes part of a windshield of a vehicle, said image display apparatus further comprising:

a scanning section for scanning the display-use laser light over said display unit; and an optical fiber for guiding the display-use laser light emitted from said laser source to said scanning section.

13. The image display apparatus according to claim 12, wherein:

said laser source is provided under a dash panel or a seat of the vehicle.

14. The image display apparatus according to claim 12, further comprising:

a display-use laser light shielding section for preventing the display-use laser light scanned by said scanning section from entering a visual space of a vehicle occupant.

15. The image display apparatus according to claim 12 wherein said controller controls said image display apparatus to cut off power supply to said laser source under conditions where a seat belt for a vehicle occupant is not locked to a specific position.

* * * * *